US010532814B2

(12) United States Patent
Chapman et al.

(10) Patent No.: US 10,532,814 B2
(45) Date of Patent: Jan. 14, 2020

(54) AUGMENTED REALITY TRAVEL ROUTE PLANNING

(71) Applicant: Disney Enterprises, Inc., Burbank, CA (US)

(72) Inventors: Steven Chapman, Burbank, CA (US); Joseph Popp, Burbank, CA (US); Calis Agyemang, Burbank, CA (US); Mehul Patel, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 171 days.

(21) Appl. No.: 15/701,384

(22) Filed: Sep. 11, 2017

(65) Prior Publication Data

US 2019/0077504 A1 Mar. 14, 2019

(51) Int. Cl.
| | |
|---|---|
| *B64C 39/02* | (2006.01) |
| *G06T 19/00* | (2011.01) |
| *G06F 3/01* | (2006.01) |
| *G05D 1/00* | (2006.01) |
| *G01C 21/36* | (2006.01) |

(52) U.S. Cl.
CPC .......... *B64C 39/024* (2013.01); *G01C 21/362* (2013.01); *G01C 21/365* (2013.01); *G01C 21/3647* (2013.01); *G05D 1/0016* (2013.01); *G06F 3/011* (2013.01); *G06T 19/006* (2013.01)

(58) Field of Classification Search
CPC .. B64C 39/024; G01C 21/362; G05D 1/0016; G06F 3/011; G06T 19/006

USPC .................................................. 701/2
See application file for complete search history.

(56) References Cited

U.S. PATENT DOCUMENTS

| | | | | |
|---|---|---|---|---|
| 9,230,367 | B2 * | 1/2016 | Stroila | G06T 11/60 |
| 10,137,361 | B2 * | 11/2018 | Perry | G06F 3/013 |
| 2011/0148924 | A1 * | 6/2011 | Tapley | G06F 3/011 |
| | | | | 345/634 |
| 2013/0328928 | A1 * | 12/2013 | Yamagishi | G02B 27/017 |
| | | | | 345/633 |
| 2014/0010407 | A1 * | 1/2014 | Sinha | G06K 9/00664 |
| | | | | 382/103 |
| 2014/0085183 | A1 * | 3/2014 | Na | G02B 27/0172 |
| | | | | 345/156 |
| 2014/0172640 | A1 * | 6/2014 | Argue | G06Q 30/0641 |
| | | | | 705/26.61 |
| 2014/0198192 | A1 * | 7/2014 | Yamamoto | H04N 21/4438 |
| | | | | 348/53 |
| 2014/0267399 | A1 * | 9/2014 | Zamer | H04L 67/20 |
| | | | | 345/633 |
| 2014/0267400 | A1 * | 9/2014 | Mabbutt | G06T 19/006 |
| | | | | 345/633 |

(Continued)

*Primary Examiner* — Tuan C To
(74) *Attorney, Agent, or Firm* — Sheppard Mullin Richter & Hampton LLP

(57) ABSTRACT

An apparatus such as a head-mounted display (HMD) may have a camera for capturing a visual scene for presentation via the HMD. A user of the apparatus may specify a pre-planned travel route for a vehicle within the visual scene via an augmented reality (AR) experience generated by the HMD. The pre-planned travel route may be overlaid on the visual scene in the AR experience so that the user can account for real-time environmental conditions determined through the AR experience. The pre-planned travel route may be transferred to the vehicle and used as autonomous travel instructions.

19 Claims, 6 Drawing Sheets

(56) References Cited

U.S. PATENT DOCUMENTS

| | | | |
|---|---|---|---|
| 2016/0004923 A1* | 1/2016 | Piekniewski | G02B 5/204 |
| | | | 348/302 |
| 2017/0103571 A1* | 4/2017 | Beaurepaire | G01C 21/3667 |
| 2017/0213393 A1* | 7/2017 | Fedosov | G06T 19/006 |
| 2017/0249021 A1* | 8/2017 | Henrique Barbosa Postal | |
| | | | G06F 3/0346 |
| 2017/0307395 A1* | 10/2017 | Kim | B60R 1/00 |
| 2017/0326726 A1* | 11/2017 | Grotmol | B25J 9/163 |
| 2017/0330034 A1* | 11/2017 | Wang | G05D 1/0088 |
| 2018/0040162 A1* | 2/2018 | Donnelly | G06T 19/006 |
| 2018/0061129 A1* | 3/2018 | Sisbot | G06T 19/006 |
| 2018/0284802 A1* | 10/2018 | Tsai | G05D 1/0246 |
| 2019/0017839 A1* | 1/2019 | Eyler | G01C 21/3638 |

\* cited by examiner

AUGMENTED REALITY TRAVEL ROUTE PLANNING

TECHNICAL FIELD

The present disclosure relates generally to augmented and/or virtual reality presentations.

DESCRIPTION OF THE RELATED ART

Cameras, such as video cameras and still cameras, can be used to capture an image, a series of images, or a video of a physical, real-world scene. Certain devices, by way of an augmented reality (AR) application or functionality, may be configured to insert virtual objects into the captured images or video before and/or while the images or video are displayed.

BRIEF SUMMARY OF THE DISCLOSURE

In accordance with one embodiment, a computer-implemented method may comprise: presenting a visual scene in an augmented reality (AR) experience; augmenting the visual scene with a travel route input by a user; and transmitting autonomous travel instructions based upon the travel route to a vehicle.

In some embodiments, the vehicle comprises at least one of an unmanned vehicle and a manned vehicle operative in an autonomous mode. The augmenting of the visual scene with the travel route may comprise presenting a visual representation of the travel route overlaid on the visual scene.

In some embodiments, the method further comprises augmenting the visual scene with a visual representation of the vehicle traveling the travel route. The method may further comprise receiving alterations to the travel route, the alterations being at least one of adjustments to the travel route input by the user and adjustments to the travel route calculated by a route calculator. Moreover, the method may comprise pre-scanning an environment represented in the visual scene and generating a collision model upon which the adjustments to the travel route calculated by the route calculator are based. Further still, the method may comprise receiving the travel route for augmenting the visual scene via gestures made by the user and visible within the visual scene presented in the AR experience.

In some embodiments, the method may comprise presenting information regarding one or more environmental conditions having a potential impact on the travel route as part of the AR experience. In some embodiments, the method may comprise presenting one or more maps as an overlay on the visual scene presented in the AR experience. Further still, the method may comprise converting a visual representation of the travel route augmenting the visual scene into the autonomous travel instructions. In some embodiments, the autonomous travel instructions comprise a sequential series of geographical coordinates characterizing the travel route.

In accordance with one embodiment, a vehicle may comprise: a communications interface receiving autonomous travel instructions generated based upon an augmented reality pre-planned travel route; a navigation unit operatively connected to the communications interface establishing geographical waypoints defining the augmented reality pre-planned travel route based upon the autonomous travel instructions; and a controller operatively connected to the navigation unit, the controller controlling the vehicle such that it autonomously travels along the geographical waypoints.

In some embodiments, the autonomous travel instructions are received from an augmented reality device with which the augmented reality pre-planned travel route is established. The augmented reality pre-planned travel route may be translated from an augmented reality representation presented by the augmented reality device into the autonomous travel instructions. The vehicle may comprise at least one of an unmanned vehicle and a manned vehicle operative in an autonomous mode.

In accordance with one embodiment, an apparatus may comprise: at least one camera adapted to capture a visual scene; an augmented reality component adapted to present the visual scene in an augmented reality (AR) experience, and augment the visual scene with a travel route input by a user; and a communications unit adapted to transmit autonomous travel instructions based upon the travel route to a vehicle.

In some embodiments, the augmented reality component augments the visual scene with the travel route by presenting a visual representation of the travel route overlaid on the visual scene. In some embodiments, the apparatus may further comprise a route calculator adapted to convert the visual representation of the travel route into a sequent of geographical waypoints defining the travel route.

The augmented reality component may generate a collision model based upon a pre-scanning of an environment represented in the visual scene, and further wherein the augmented reality component provides proposed adjustments to the travel route based upon the collision model. The augmented reality component may present information regarding at least one of one or more environmental conditions and one or more perspective views having a potential impact on the travel route as part of the AR experience, and one or more maps as an overlay on the visual scene presented in the AR experience.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

The use of unmanned vehicles, such as unmanned aerial vehicles or drones, has increased in recent times. Drones are being used in various contexts, such as for delivering purchased items to customers, monitoring weather conditions, taking photographs and/or video, as well as for providing aerial lighting during filming to name just a few. Some drones can be controlled with a remote controller unit communicating wirelessly with the drone, e.g., via radio frequency (RF) signals. Some drones can be controlled using a pre-planned flight path that can be generated with map-related software. In the case of pre-planned flight paths, however, users are limited to static maps and flight planning software that may be outdated, thereby failing to represent a current state of a location or area in which users may wish to operate their drone. Thus, a pre-planned flight path generated using conventional systems and methods may result in a drone encountering unforeseen obstacles, or a pre-planned flight path that does not meet the user's desires.

In accordance with various embodiments, an AR experience can be presented to a user through which the user may generate a pre-planned flight path that can be used to control the flight of a drone. By leveraging AR technologies, the user can experience, e.g., visualize, a particular location/area in which the user will be operating his/her drone in its current state. Thus, a pre-planned flight path can avoid issues associated with conventional systems and methods of pre-planned flight path generation.

Figure 1:
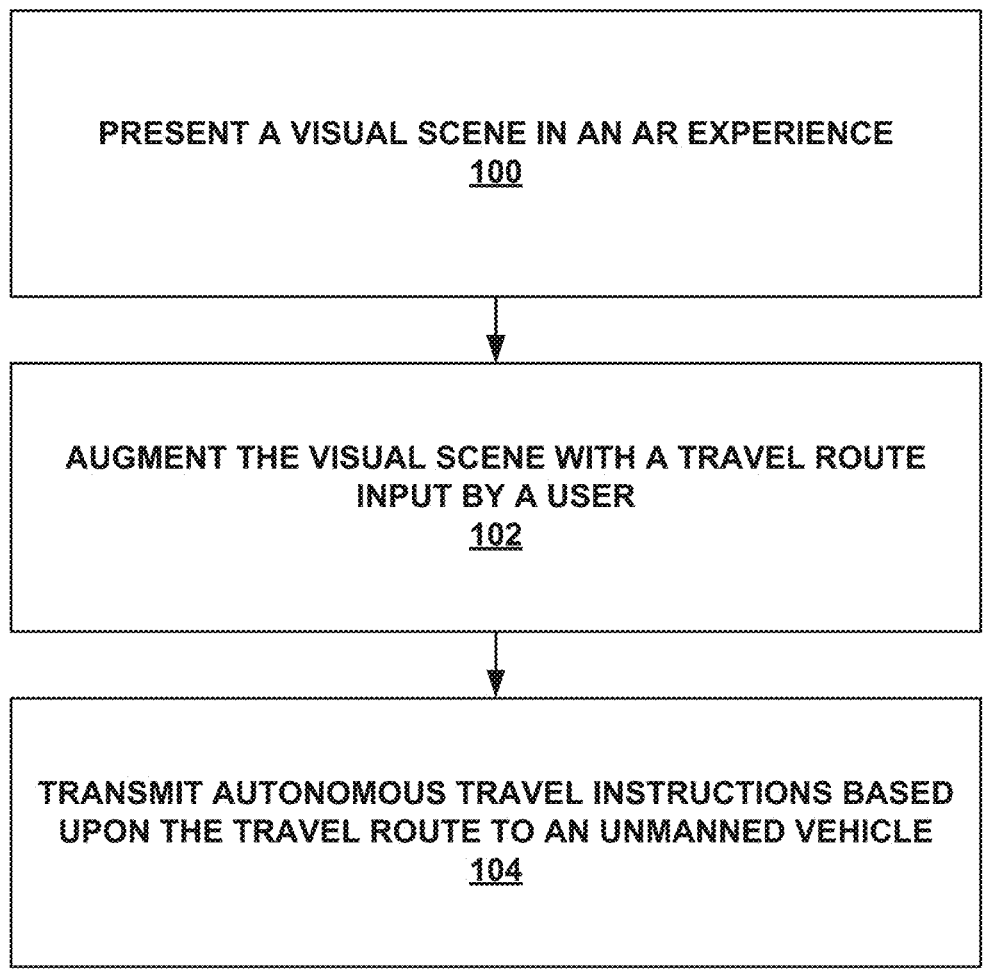
FIG. 1 is an operational flow diagram illustrating an example process for planning a travel route using an augmented reality experience in accordance with various embodiments.
Figure 2:
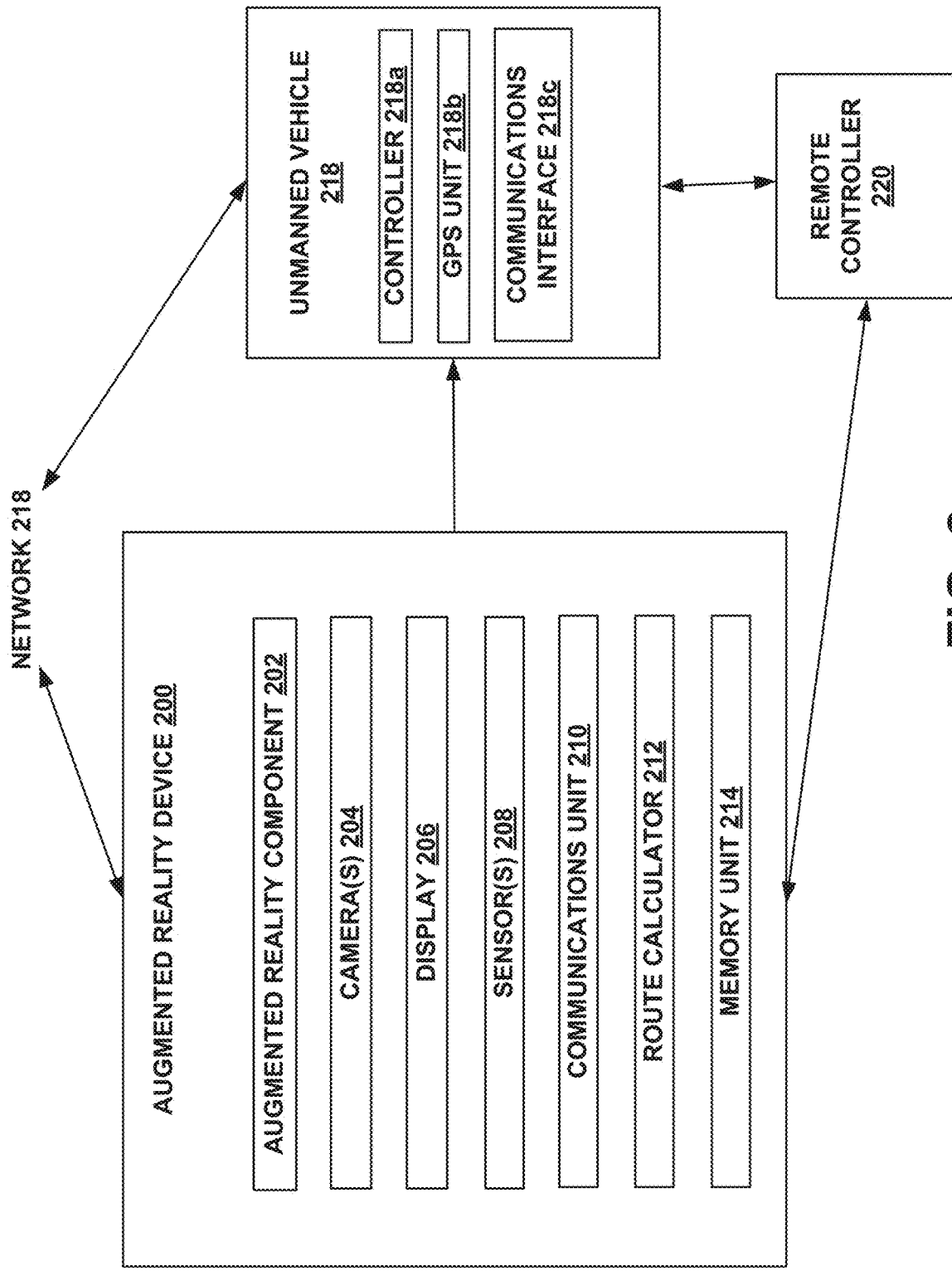
FIG. 2 illustrates an example augmented reality system in accordance with various embodiments.
Figure 3:
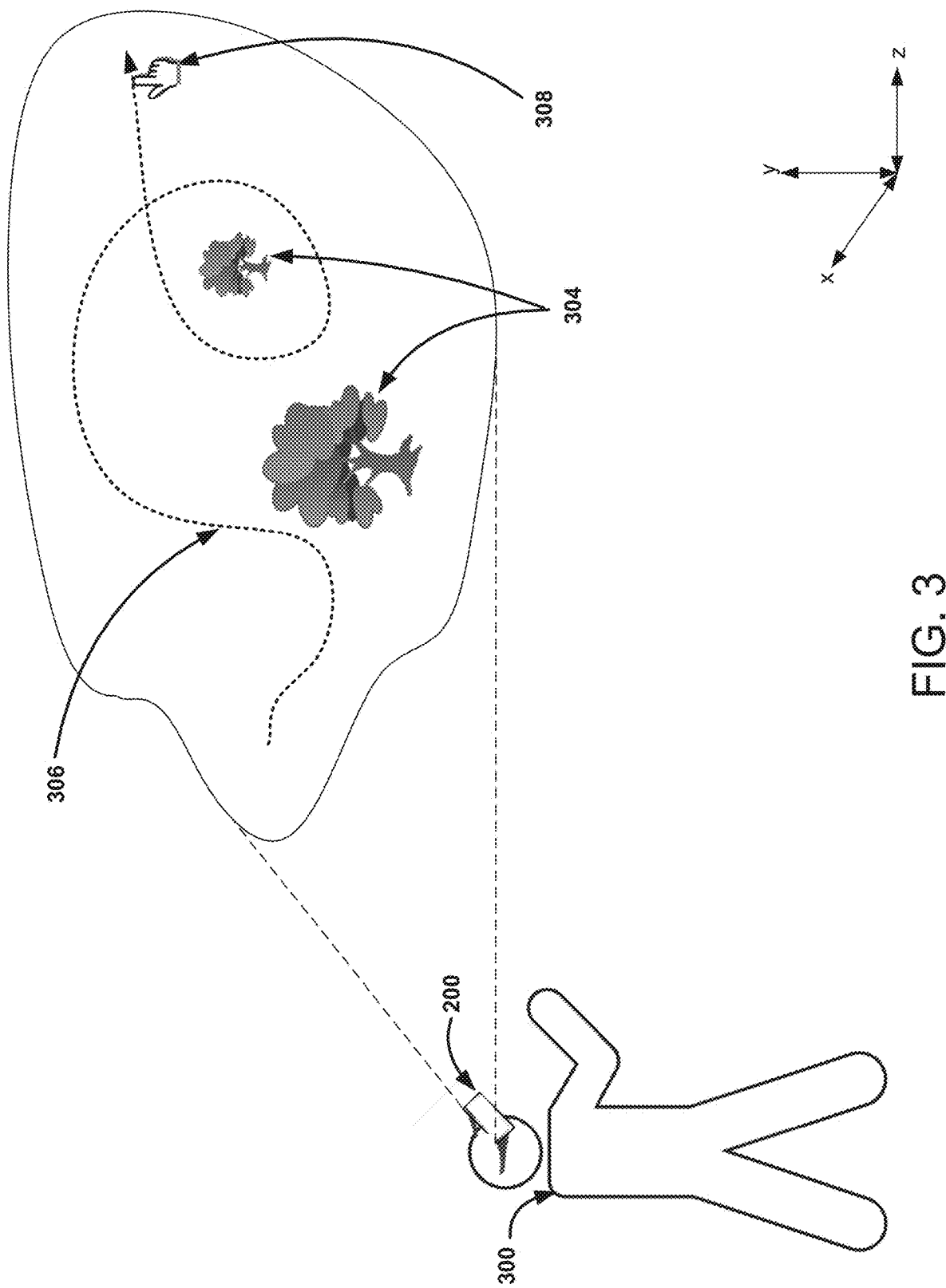
FIG. 3 illustrates an example augmented reality travel route planning experience in accordance with various embodiments.

FIG. 1 illustrates example operations that can be performed in accordance with various embodiments for generating a travel route using an AR experience. At operation 100, a visual scene may be presented in an AR experience. The visual scene (an example of which is illustrated in FIG. 3) may be captured by some form of AR device. FIG. 2 illustrates an example representation of such an AR device 200, which may be implemented as solely an AR device, such as a head-mounted display, a see-through display, an optical see-through display, a video see-through display, a visor, glasses, etc. or as part of another user device, such as a laptop PC. As shown, AR device 200 includes an augmented reality component 202, one or more cameras 204, a display 206, one or more sensors 208, such an accelerometer, a communications unit 210, route calculator 212, and a memory unit 214.

As used herein, an AR device refers to any device capable of displaying a real-time view of a physical, real-world environment while altering elements within the displayed view of the environment. As such, an AR device displays a view of the real world but augments (e.g., adds or modifies) elements using computer graphics technology. Such an AR device may include and/or be communicatively coupled to a camera device (or multiple camera devices) used to capture a view of the real-world environment and may further include computer software and/or hardware configured to augment elements of the captured scene. When a user looks through or at the AR device, the user sees an augmented view of the physical real-world environment in which the user is located.

The one or more cameras 204 may include cameras for capturing the visual scene, which may then be displayed to a user through display 206, which as described above, may be a see-through display. As used herein, a visual scene refers to a view(s) of the real-world environment in which the AR device 300 is being used. For instance, a visual scene may be a series of images of a real-world environment. In the example illustrated in FIG. 3, the visual scene captured by AR device 200 includes one or more objects or obstacles, such as trees 304. Generally, one or more sensor(s) 208 may be a device(s) capable of measuring the physical acceleration, movement, positioning, etc. of the AR device 200. In this way, the user's movement can be tracked and used to accurately represent that user's view or field of view through the AR device 200. For example, AR component 202 may use the one or more sensor(s) 208 to determine when the position of AR device 200 is changing, for example, which could indicate that the position of the AR device 200 relative to the user and/or visual scene is changing.

Returning to FIG. 1, at operation 102, the visual scene presented in the AR experience may be augmented with a travel route input by a user. For example, referring to FIG. 3, a user 300 may visualize a scene through AR device 200. The visual scene may be that of some area in which user 300 wishes to fly his/her drone. The visual scene may include obstacles, for example, trees 304.

In accordance with various embodiments, user 300 may trace a desired flight pattern he/she wishes his/her drone to travel. That is, in the AR experience provided by AR device 200, user 300 may use his/her finger (represented in the AR experience as finger icon 308) to trace/make gestures representative of a travel route 306. It should be appreciated that because user 300 is visualizing the scene in real-time, obstacles, such as trees 304 may be taken into account and avoided. When using conventional systems for generating pre-planned flight patterns or routes, the user may only see, for example, a topographical map that does not have information regarding any potential obstacles that a drone might encounter. Additionally, conventionally-obtained satellite maps may have outdated representations of a particular area that may fail to reflect current obstacles or state of the area. One or more cameras 204 may recognize the user's finger in the visual scene represented in the AR experience, and may track the route that the user's finger travels. Information reflecting the route may be relayed to AR component 202 so that a visual representation of the route may be displayed, e.g., as travel route 306. In some embodiments, one or more sensors 208 may comprise a microphone adapted to receive audio signals, e.g., user 300's voice, allowing user 300 to generate a travel route using voice commands.

In some embodiments, an AR representation of a drone may be presented in the AR experience, and a virtual flight of the drone can be presented to user 300 so that user 300 can review the travel route he/she has input. In some embodiments, user 300 may correct, edit, or otherwise alter travel route 306 within the AR experience.

In still other embodiments, an existing travel route can be input into AR device 200 via memory unit 214, where AR component 202 can present that existing travel route in the AR experience. Based on this "initial" travel route, user 300 may edit or alter the travel route as described herein using AR device 200. That is, the existing travel route (that may have been generated using conventional pre-planned travel routing software) can be viewed in a real-world representation. This way, obstacles that may not have been present or recognized in the conventionally pre-planned travel route can be identified and accounted for by altering the travel route.

In some embodiments, route calculator 212 may analyze the existing travel route in conjunction with information received from AR component 202, one or more cameras 204, display 206, and/or one or more sensors 208 reflecting a current scene and any relevant information, such as obstacles, determined therefrom. In some embodiments route calculator 212 may analyze a drone's view based on a travel route so that, e.g., a cinematographer or photographer can be informed as to what he/she can expect to frame and/or capture before an actual flight of the drone. The drone's predicted view can be presented in real-time and/or recorded for more robust flight analysis. Decisions regarding camera aim, lens focal length, etc. can be determined based on this predicted view/captured scene modeling.

In some embodiments, route calculator 212 may automatically edit or alter the existing travel route according to the above information. In some embodiments, AR device 200 may initiate one or more alarms based on determined obstacles or other potential errors or problems that could arise in view of the existing travel route and the currently visualized scene. It should be understood that alarms or notifications can be generated in accordance with other embodiments described herein when potential problems exist or are predicted with a travel route.

In some embodiments, a tracking marker (not shown) may be attached to the user's finger, and one or more cameras 204 (or a separate tracking unit (not shown)) may monitor the tracking marker and store information regarding its position and/or movement. In some embodiments, remote controller 220 of unmanned vehicle 218 may be operatively connected to AR device 202, e.g., by Bluetooth, Near Field Communications (NFC), RF communications, or the like. In this way, a travel route may be input by user 300 using remote controller 220 and visualized through AR device 200. In other embodiments, a virtual representation of a drone's controller may be displayed on display 206 to user 300 during the AR experience. In this way, the virtual representation of the drone's controller may be utilized by user 300 to input a desired travel route, described in greater detail below with respect to FIGS. 4A and 4B.

Once a travel route, e.g., travel route 306, has been input and captured by AR device 200, the travel route 306 may be analyzed by route calculator 212 to translate or convert the visual representation of travel route 306 into travel commands or instructions that can be used by unmanned vehicle 218. That is, the visual representation of travel route 306 may be transformed into a sequential series of coordinates, e.g., coordinates based on a ground-truth established with and/or relative to the AR device 200, positioning data, manually established landmark coordinates, etc. that embody the travel route. For example, the coordinates may be used as inputs to GPS unit 218b, which can define a travel route, e.g., waypoints that define a path or trajectory. These in turn can be utilized by controller 218a to direct the travel of unmanned vehicle 218. It should be noted that other methods can be used to transform or translate the visual representation of travel route 306 to instructions to be used by controller 218a and/or GPS unit 218b to direct the travel of unmanned vehicle 218. In some embodiments, a common reference coordinate system between AR device 200, the drone, and the real-world may include some combination of a GPS sensor, GLONASS sensor, differential GPS augmentation transmitter, and/or marker device that acts as a satellite for the drone's sensors that are not necessarily directly related to GPS data. That is, a "lighthouse" or network of lighthouse markers can be used to emit visual and/or radio signals that can be used by the AR device 200 and the drone as a reference coordinate system.

It should be noted that although route calculator 212 is illustrated in FIG. 2 as being a part of AR device 200, route calculator 212 may instead be implemented in unmanned vehicle 218 and/or remote controller 220. That is, the visual representation of travel route 306 may be transmitted "as is" to unmanned vehicle 218 or remote controller 220 to be converted. When remote controller 220 is used to convert travel route 306 into travel commands or instructions, remote controller 220 can communicate the travel commands or instructions (utilizing its existing communications capabilities) to unmanned vehicle 218.

Returning to FIG. 1, at operation 104, autonomous travel instructions based upon the travel route may be transmitted to an unmanned vehicle. In some embodiments, communications unit 210 may transfer the series of coordinates directly to unmanned vehicle 218 via communications interface 218c. Controller 218a in conjunction with GPS unit 218b may instruct unmanned vehicle 218 to traverse the series of coordinates, thereby following the travel route 306 input by user 300 through and/or visualized using AR device 200.

Figure 4A:
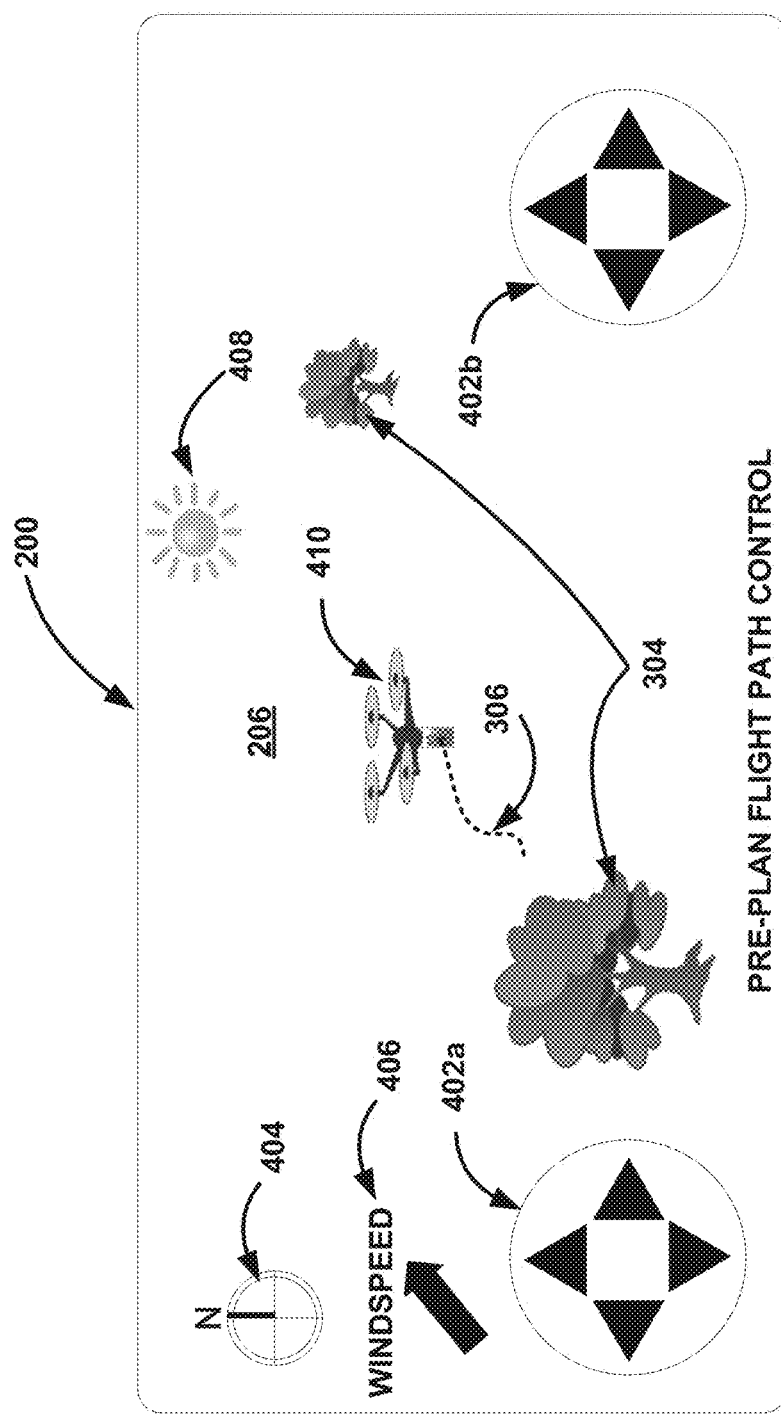
FIGS. 4A and 4B illustrate example user interfaces used in augmented reality travel route planning in accordance with various embodiments.

FIG. 4A illustrates one example of a user interface with which user 300 may input a travel route, e.g., travel route 306. As noted previously, AR device may display a virtual representation of remote controller 220's control interface as part of the AR experience presented to user 300. For example, virtual controllers 402a and 402b can be displayed, where virtual controllers 402a and 402b represent controls for forward and backward throttle, pitch, yaw, roll, etc. of a drone (which may be an embodiment of unmanned vehicle 218, and represented visually as drone 410 on display 206 of AR device 200). User 300 may virtually operate controller 402a and 402b using his/her finger(s) within the AR experience, or may operate physical controllers on remote controller 220 that are represented by controllers 402a and 402b.

Various types of information or data that can be used when generating or planning a travel route can be presented to user 300. For example, a compass 404 can be displayed informing user 300 of the direction in which he/she is looking and/or in which drone 410 is to travel. Wind speed information 406 can be provided, as well as sun position information 408. Because wind speed can impact the flight characteristics of a drone, user 300 can consider wind speed information when generating travel route 306, e.g., by specifying a travel route that gives more berth around obstacles, such as trees 304. Sun position information can be considered by user 300 if the drone is being utilized to provide aerial lighting and/or being utilized to film a scene, as this can impact contrast, brightness, white balance, and the like in a resulting video-capture.

Referring back to FIG. 2, such information, and other information that may be relevant to the travel route of an unmanned vehicle, can be obtained from one or more data stores, information providers/services, etc. via network 218. In some embodiments, this information can be simulated and incorporated into the AR experience provided by AR device 200. In some embodiments, a visual scene captured by AR device 200 can be used to "pre-scan" the environment represented in the visual scene, and used to automatically generate a suggested travel route, generate a collision model, etc.

Figure 4B:
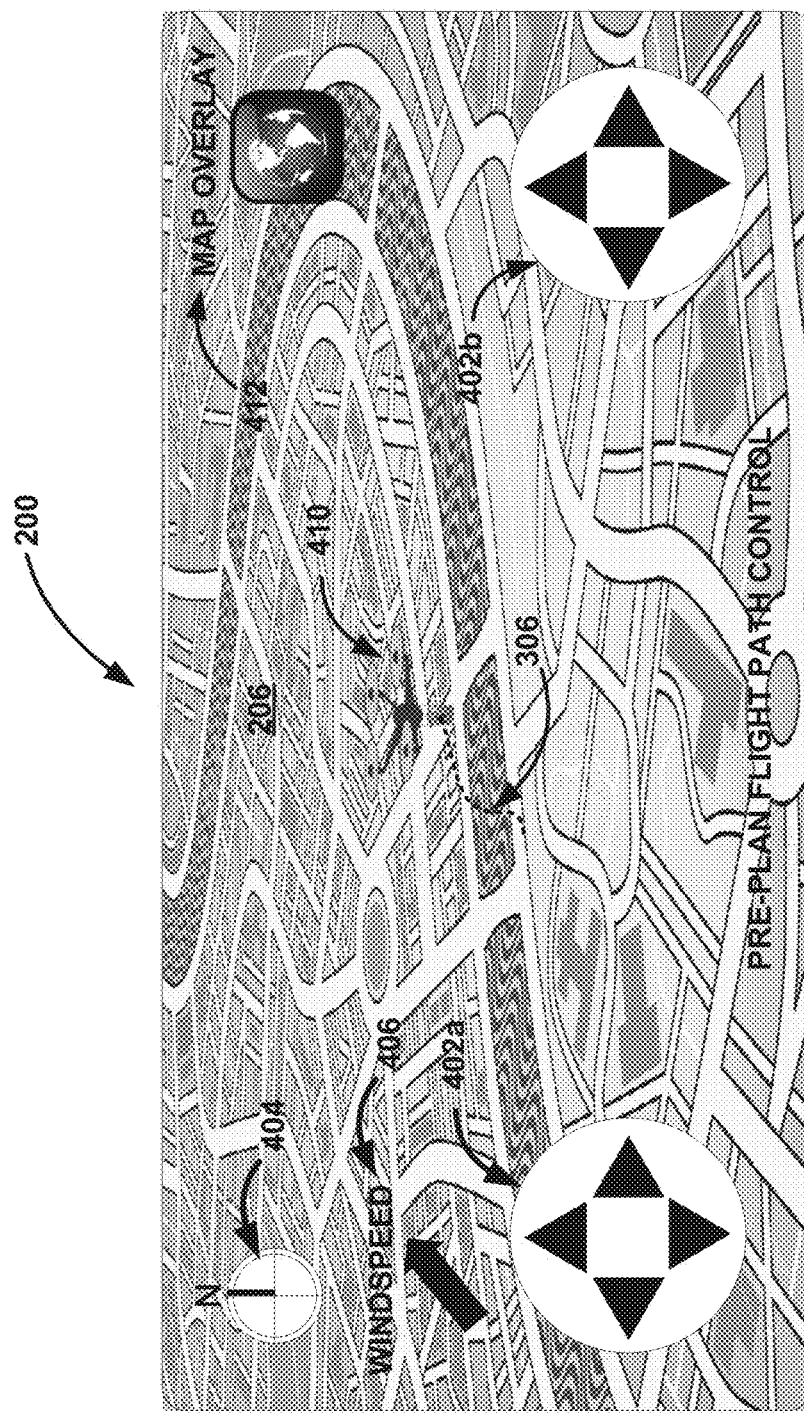

Similarly, FIG. 4B illustrates an example of another user interface with which user 300 may input a travel route. In this example, a map overlay option 412 can be provided. When selected, map overlay option 412 results in a map being presented as an overlay to the visual scene captured by AR device 200. As noted above, an appropriate map to be used as the overlay may be obtained from one or more data stores or information service providers via, e.g., network 218. In accordance with other embodiments, user 300 may upload a map of his/her choice to memory unit 214 of AR device 200. It should be understood that the map used as the overlay should correspond to the current location or area being captured as the visual scene. In some embodiments, however, the scale of the map and/or the visual scene can be altered or adjusted to give user 300 varying perspectives that may aid him/her in generating a desired travel route. In some embodiments, more than one map may be presented. For example, multiple types of maps may be overlaid on each other, and/or display 206 may present multiple screens on which different maps or different map perspectives can be shown.

It should be noted that although various embodiments described in the present disclosure may reference drones or unmanned aerial vehicles, the technologies disclosed herein are not limited to unmanned aerial vehicles. Various embodiments can also be used to generate travel routes for unmanned automotive vehicles, unmanned aquatic vehicles, etc. Various embodiments can also be used to generate travel routes for manned vehicles that at times, may operate in an unmanned mode, e.g., autopilot mode, for example.

Moreover, various embodiments can be utilized to provide a user with better awareness of the manned/unmanned vehicle he/she wishes to control. For example, in some embodiments, unmanned vehicle 218 may be associated with AR device 200 such that it may be tracked and/or monitored, e.g., via one or more cameras 204 and/or one or more sensors 208. In this way, if user 300 loses visual sight of unmanned vehicle 218, AR device 200 may nonetheless be able to continue tracking its position or movement.

Figure 5:
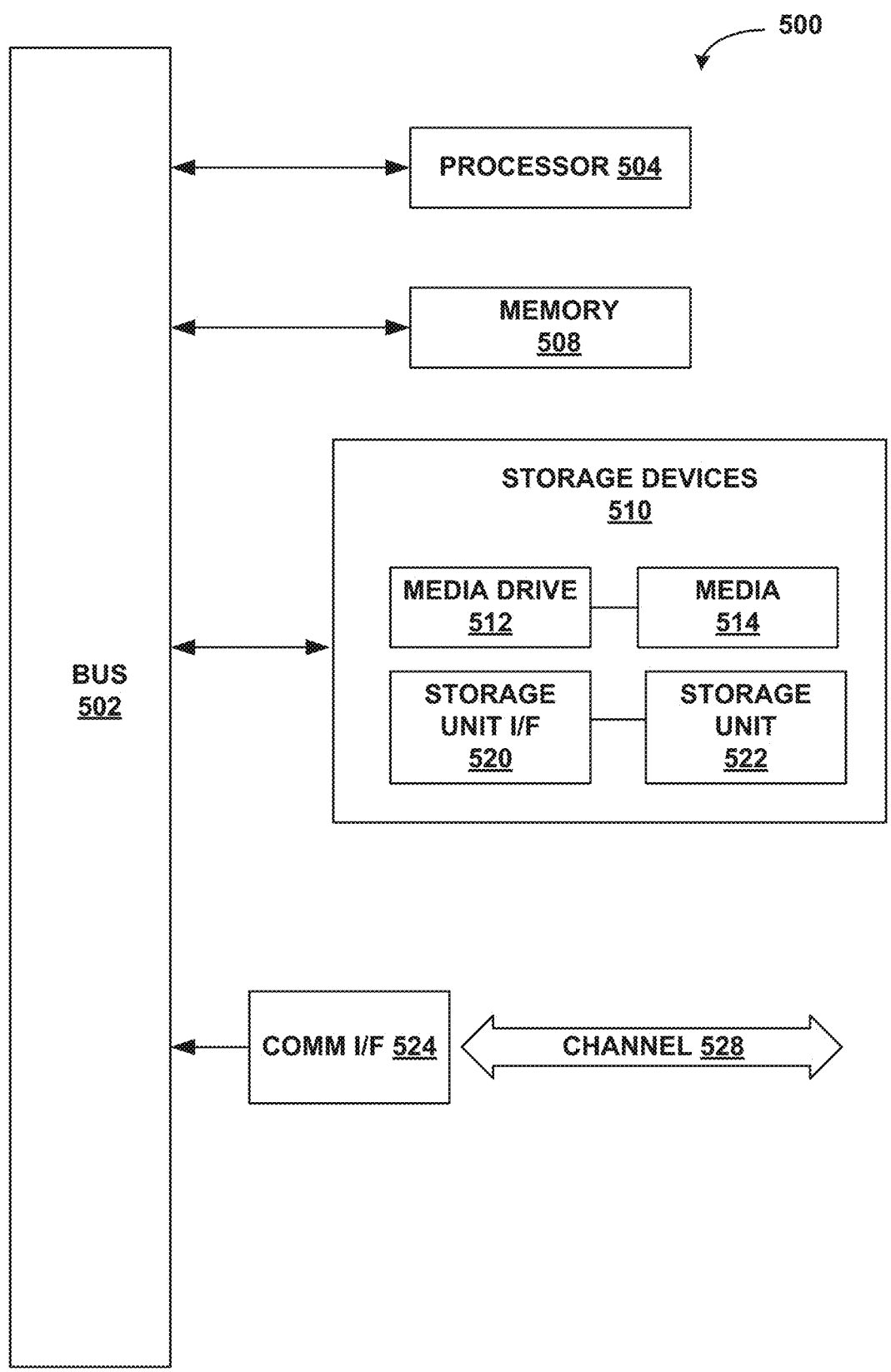
FIG. 5 is an example computing component that may be used to implement various features of embodiments described in the present disclosure.

FIG. 5 illustrates an example computing component that may be used to implement various features of the system and methods disclosed herein, for example, augmented reality device 200, unmanned vehicle 218, remote controller 220, and/or any of their respective component parts.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example navigation systems, portable computing devices, and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the elements or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   presenting a visual scene in an augmented reality (AR) experience;
   augmenting the visual scene with a travel route input by a user;
   transmitting autonomous travel instructions based upon the travel route to a vehicle; and
   receiving alterations to the travel route, the alterations being at least one of adjustments to the travel route input by the user and adjustments to the travel route calculated by a route calculator.

2. The computer-implemented method of claim 1, wherein the vehicle comprises at least one of an unmanned vehicle and a manned vehicle operative in an autonomous mode.

3. The computer-implemented method of claim 1, wherein the augmenting of the visual scene with the travel route comprises presenting a visual representation of the travel route overlaid on the visual scene.

4. The computer-implemented method of claim 1, further comprising augmenting the visual scene with a visual representation of the vehicle traveling the travel route.

5. The computer-implemented method of claim 1, further comprising pre-scanning an environment represented in the visual scene and generating a collision model upon which the adjustments to the travel route calculated by the route calculator are based.

6. The computer-implemented method of claim 1, further comprising receiving the travel route for augmenting the visual scene via gestures made by the user and visible within the visual scene presented in the AR experience.

7. The computer-implemented method of claim 1, further comprising presenting information regarding one or more environmental conditions having a potential impact on the travel route as part of the AR experience.

8. The computer-implemented method of claim 1, further comprising presenting one or more maps as an overlay on the visual scene presented in the AR experience.

9. The computer-implemented method of claim 1, further comprising converting a visual representation of the travel route augmenting the visual scene into the autonomous travel instructions.

10. The computer-implemented method of claim 9, wherein the autonomous travel instructions comprise a sequential series of geographical coordinates characterizing the travel route.

11. A vehicle, comprising:
a communications interface receiving autonomous travel instructions generated based upon an augmented reality pre-planned travel route;
a navigation unit operatively connected to the communications interface establishing geographical waypoints defining the augmented reality pre-planned travel route based upon the autonomous travel instructions; and
a controller operatively connected to the navigation unit, the controller controlling the vehicle such that it autonomously travels along the geographical waypoints.

12. The vehicle of claim 11, wherein the autonomous travel instructions are received from an augmented reality device with which the augmented reality pre-planned travel route is established.

13. The apparatus of claim 12, wherein the augmented reality pre-planned travel route is translated from an augmented reality representation presented by the augmented reality device into the autonomous travel instructions.

14. The apparatus of claim 11, wherein the vehicle comprises at least one of an unmanned vehicle and a manned vehicle operative in an autonomous mode.

15. An apparatus, comprising:
at least one camera adapted to capture a visual scene;
an augmented reality component adapted to present the visual scene in an augmented reality (AR) experience, and augment the visual scene with a travel route input by a user; and
a communications unit adapted to transmit autonomous travel instructions based upon the travel route to a vehicle and to receive alterations to the travel route, the alterations being at least one of adjustments to the travel route input by the user and adjustments to the travel route calculated by a route calculator.

16. The apparatus of claim 15, wherein the augmented reality component augments the visual scene with the travel route by presenting a visual representation of the travel route overlaid on the visual scene.

17. The apparatus of claim 16, further comprising a route calculator adapted to convert the visual representation of the travel route into a sequent of geographical waypoints defining the travel route.

18. The apparatus of claim 14, wherein the augmented reality component generates a collision model based upon a pre-scanning of an environment represented in the visual scene, and further wherein the augmented reality component provides proposed adjustments to the travel route based upon the collision model.

19. The apparatus of claim 14, wherein the augmented reality component presents information regarding at least one of one or more environmental conditions and one or more perspective views having a potential impact on the travel route as part of the AR experience, and one or more maps as an overlay on the visual scene presented in the AR experience.

* * * * *